United States Patent Office 3,658,873
Patented Apr. 25, 1972

---

3,658,873
METHYLENE-BIS-(PHENYL-SULFIDE)-4-PHENYLSULFONIC ACID ESTERS
Wilhelm Sirrenberg, Sprockhoevel, Westphalia, Gunter Unterstenhofer, Opladen, and Ingeborg Hammann, Cologne, Germany, assignors to Farbenfabriken Bayer Aktiengesellschaft, Leverkusen, Germany
No Drawing. Filed June 30, 1969, Ser. No. 837,934
Claims priority, application Germany, July 5, 1968,
P 17 68 833.4
Int. Cl. C07c *143/68*
U.S. Cl. 260—456 P    9 Claims

ABSTRACT OF THE DISCLOSURE

Methylene-bis-(phenyl-sulfide) - 4 - phenylsulfonic acid esters or phenylsulfonic acid 4-(phenylmercaptomethylmercapto)-phenyl esters, i.e. methylene-bis-(phenyl-sulfide)-2,3 or 4-(optionally chloro)-4'-(4"- optionally chloro and fluoro)-phenylsulfonic acid esters or 4-(optionally chloro and fluoro)-phenylsulfonic acid 4'-(4"-optionally chloro - phenylmercaptomethylmercapto)-phenyl esters, which possess acaricidal properties, and specifically the ability to kill acarids at all stages of development, including the egg stage, and which may be produced by conventional methods.

---

The present invention relates to and has for its objects the provision for particular new methylene-bis-(phenyl-sulfide)-4-phenylsulfonic acid esters or phenylsulfonic acid 4-(phenylmercaptomethylmercapto)-phenyl esters, i.e. methylene-bis-(phenyl-sulfide)- 2,3 or 4-(optionally chloro)-4'-(4"-optionally chloro and fluoro)-phenylsulfonic acid esters or 4-(optionally chloro and fluoro)-phenylsulfonic acid 4'-(4"-optionally chloro-phenylmercaptomethylmercapto)-phenyl esters, which possess acaricidal properties, and specifically the ability to kill acarids at all stages of development, including the egg stage, active compositions in the form of mixtures of such compounds which solid and liquid dispersible carrier vehicles, and methods for producing such compounds and for using such compounds in a new way especially for combating pests, e.g. acarids, with other and further objects becoming apparent from a study of the within specification and accompanying examples.

It is known that phosphoric acid esters can be used for the control of spider mites. From this group of compounds, O,O-diethyl-O-p-nitro-phenyl-phosphoric thioate (A) and O,O-dimethyl-S-(4-oxybenzotriazine-3-methyl)-phosphoric dithioate (B) in particular have attained considerable importance. A disadvantage of these compounds, however, is that in the case of spider mites a notable resistance has already developed with respect thereto.

It has been found, in accordance with the present invention, that the particular new methylene-bis-(phenyl-sulfide)-4-phenylsulfonic acid esters of the formula

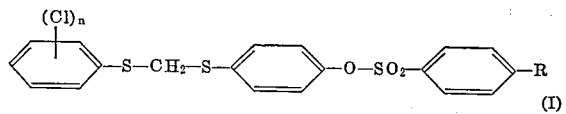

(I)

in which

R is hydrogen, chloro or fluoro, and $n$ is a whole number from 0 to 1, exhibit strong acaricidal properties, and specifically the ability to kill acarids at all stages of their development, including the egg stage.

It has been furthermore found, in accordance with the present invention, that the compounds of Formula I above may now be produced by the process which comprises:

Reacting a thiophenol of the formula

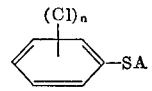

(II)

in which $n$ is the same as defined above, and

A is hydrogen or an equivalent of a metal such as alkali metal (e.g. potassium or sodium) or alkaline earth metal (e.g. magnesium, calcium or barium), with a phenyl-sulfonic acid phenyl ester of the formula

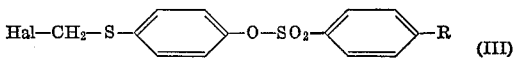

(III)

in which

R is the same as defined above, and

Hal is halogen such as chloro, bromo, fluoro or iodo, especially chloro;

It is distinctly surprising that the compounds of Formula I above according to the present invention have a stronger acaricidal and ovicidal activity than the previously known compounds heretofore used for this purpose such as O,O-diethyl-O-p-nitro-phenyl phosphoric thioate (A) and O,O-dimethyl-S-(4-oxy-benzotriazine - 3 - methyl)-phosphoric dithioate (B). The compounds of the present invention therefore represent a valuable contribution to the art.

Advantageously, in accordance with the present invention, in the various formulae herein:

R represents hydrogen; chloro; or fluoro;

$n$ represents a whole number from 0 to 1, the chloro being in 2,3 or 4-position, especially 4-position, preferably, with the proviso that at least R is chloro or fluoro when $n$ is 0 and $n$ is 1 when R is hydrogen.

The reaction course of the process recited above corresponds to the following reaction scheme

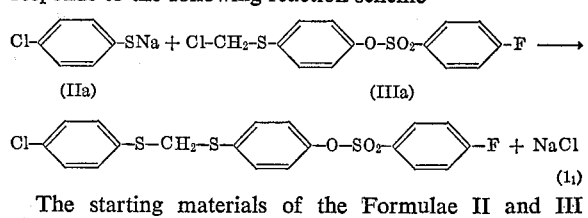

(I₁)

The starting materials of the Formulae II and III above required for said process are known. The thiophenols of Formula II above are preferably used in the form of the corresponding alkali metal salts, in particular those of potassium or sodium, or in the form of the corresponding alkaline earth metal salts, in particular those of magnesium, calcium or barium.

The reaction of said process is expediently carried out in a solvent (which term includes a mere diluent). For this purpose, inert organic solvents are suitable. The preferred solvents include hydrocarbons, such as benzine, toluene and xylene; ethers, such as diethyl ether and dioxan; alcohols, such as methyl alcohol and ethyl alcohol; and the like. In many cases, water can also be used. The reaction can also be carried out without solvents or diluents.

The reaction temperatures of the process can be varied within a fairly wide range, since the end products are fairly stable compounds. In general, the process is carried out at substantially between about 0–180° C., and preferably between about 20–100° C.

When carrying out the process the starting materials are expediently used in equimolar proportions. Working up of the reaction product takes place in customary manner, e.g. by distillation, recrystallization or re-dissolving.

If the free thiophenols of Formula II above are used, an acid binder is expediently added.

As acid binders for said process, all customary acid binding agents can be used. When working in aqueous medium, alkali metal hydroxides, such as potassium hydroxide or sodium hydroxide, or alkali metal carbonates, such as sodium carbonate or potassium carbonate, and the like, are expediently used. When working in organic solvents, tertiary amines, such as pyridine, picoline, dimethylaniline, diethylaniline, trimethylamine, triethylamine, and the like, are expediently used.

Advantageously, the active compounds according to the present invention exhibit strong acaricidal effects, with comparatively low mammalian toxicity and concomitantly low phytotoxicity. The effects set in rapidly and are long-lasting. The instant compounds can therefore be used with markedly good results for the control of mites (Acarina).

In the case of the mites contemplated herein, particularly important are the spider mites (Tetranychidae) such as the two-spotted spider mite (*Tetranychus urticae*), the European red mite (*Panonychus ulmi*); gall mites, such as the current gall mite (*Eriophyes ribis*) and tarsonemids, such as *Tarsonemus pallidus*, and ticks; and the like.

The instant active compounds are actually effective in the case of all development stages of the mites, particularly also against eggs.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal formulations or compositions, e.g. conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, or insecticides, rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–5%, preferably 0.005–3%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, i.e. acarids, at all stages of their development, including the egg stage, and more particularly, methods of combating acarids which comprise applying to at least one of correspondingly (a) such acarids, (b) such acarid eggs, and (c) the corresponding habitat, i.e. the locus to be protected, a correspondingly combative or toxic amount, i.e. an acaricidally or ovicidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated, without limitation, by the following examples:

EXAMPLE 1

Tetranychus test

Solvent: 3 parts by weight acetone.
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the given preparation of active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 1:

TABLE 1.—PLANT-DAMAGING MITES

*Tetranychus urticae*, resistant

| Active compound | Concentration of active compound in percent | Degree destruction in percent after 8 days |
|---|---|---|
| (B) (known) | 0.1 | 0 |
| (A) (known) | 0.1<br>0.05<br>0.02 | 70<br>50<br>0 |
| (2₁) | 0.1<br>0.05<br>0.02<br>0.01<br>0.004 | 95<br>95<br>90<br>75<br>50 |
| (3₁) | 0.1<br>0.05<br>0.02<br>0.01<br>0.004 | 100<br>95<br>95<br>80<br>50 |
| (1₃) | 0.1<br>0.05<br>0.02<br>0.01<br>0.004 | 98<br>95<br>95<br>98<br>90 |
| (4₁) | 0.1<br>0.05<br>0.02 | 98<br>08<br>50 |

The following further examples illustrate, without limitation, the process for producing the active compounds according to the present invention.

EXAMPLE 2

(2₂) 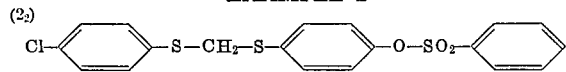

29 g. of 4-chloro-thiophenol are dissolved in 250 ml. of ethyl alcohol, and an equivalent amount of sodium alcoholate solution is added. Stirirng is effected for 5 minutes at 40° C., and 63 g. of phenylsulfonic acid 4'-chloromethylmercapto-phenyl ester are then added dropwise. The mixture is heated under reflux for 2 hours, and is kept weakly alkaline during this time by addition of a little more (ca. 2 ml.) sodium alcoholate solution. After completion of the reaction, the contents of the flask are poured into water, and the product which has separated as an oil is taken up in methylene chloride. The methylene chloride solution is washed once with a dilute solution of sodium hydroxide and then twice with water, and subsequently dried. After the solvent has been distilled off, the compound remains behind as oil $n_D^{20}=1.6431$, yield: 70 g. (83% of the theory) of methylene-bis-(phenyl-sulfide) - 4 - chloro-4'-phenylsulfonic acid ester, i.e. phenylsulfonic acid 4 - (4' - chloro-phenylmercaptomethylmercapto)-phenyl ester.

EXAMPLE 3

(3₂) 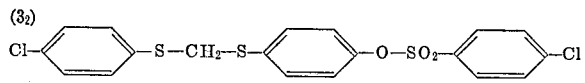

29 g. of 4-chloro-thiophenol are dissolved in 250 ml. of ethyl alcohol, and an equivalent amount of sodium alcoholate solution is added. The mixture is stirred for 5 minutes at 40° C., and 69.6 g. of 4-chlorophenylsulfonic acid 4'-chloromethylmercapto-phenyl ester are then added dropwise, and boiling under reflux is effected for 2 hours. During this time the mixture is kept weakly alkaline by addition of a little (ca. 2 ml.) sodium alcoholate solution. For working up, the contents of the flask are poured into water, and the separated oil is taken up in methylene chloride. The solution is washed once with a dilute solution of sodium hydroxide and then twice with water, and subsequently dried. After the solvent has been distilled off, the compound is obtained as an oil. $n_D^{20}=1.6448$, yield: 82 g. (89.5% of the theory) of methylene-bis-(phenylsulfide)-4-chloro-4'-(4''-chloro)-phenylsulfonic acid ester, i.e. 4-chloro-phenylsulfonic acid 4' - (4'' - chloro-phenylmercaptomethylmercapto)-phenyl ester.

EXAMPLE 4

(1₄) 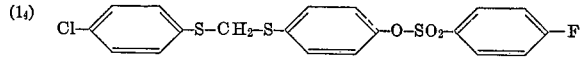

29 g. of 4-chloro-thiophenol are dissolved in 250 ml. of ethyl alcohol and converted into the corresponding thiophenolate by addition of an equivalent amount of sodium alcoholate solution. Stirring is continued for 5 minutes at 40° C., and 66.6 g. 4-fluoro-phenylsulfonic acid 4'-chloromethylmercapto-phenyl ester are then added and the mixture is boiled for 2 hours. The reaction solution is kept weakly alkaline by addition of a little more (ca. 2 ml.) sodium alcoholate solution. After the reaction is complete, the mixture is poured into water, and the separated oil is taken up in methylene chloride. The methylene chloride solution is washed with a dilute solution of sodium hydroxide and then twice with water. After drying of the solution, the solvent is distilled off. The substance remains behind as an oil. After some time, crystallization occurs. $n_D^{20}=1.6320$, M.P. 72° C., yield: 77 g. (87% of the theory) of methylene-bis-(phenyl-sulfide)-4-chloro-4'-(4''-fluoro)-phenylsulfonic acid ester, i.e. 4-fluoro-phenylsulfonic acid 4' - (4'' - chloro-phenylmercaptomethylmercapto)-phenyl ester.

EXAMPLE 5

(4₂)

22 g. of thiophenol are dissolved in 250 ml. of ethyl alcohol, and an equivalent amount of sodium ethylate solution is added. The mixture is stirred for 5 minutes at 40° C., and 66.6 g. 4-fluoro-phenylsulfonic acid 4'-chloromethylmercaptophenyl ester are then added, and boiling under reflux is effected for 2 hours. During this time, the reaction solution is kept weakly alkaline by addition of little additional amounts of ca. 2 ml. sodium ethylate solution. After completion of the reaction, cooling is effected and the mixture is poured into water. The product which has separated as oil is taken up in methylene chloride, washed with a dilute solution of sodium hydroxide and then twice with water, and the solution is dried. After the solvent has been distilled off, the compound remains behind as an oil. $n_D^{20}=1.6283$, yield: 72 g. (88% of the theory) of methylene - bis-(phenyl-sulfide)-4-(4'-fluoro)-phenylsulfonic acid ester, i.e. 4-fluoro-phenylsulfonic acid 4'-phenylmercaptomethylmercapto)-phenyl ester.

It will be realized that all of the foregoing compounds contemplated by the present invention possess the desired selective pesticidal, especially acaricidal and ovicidal, properties for combating acarids, even in the egg stage, and that such compounds have not only a very slight toxicity toward warm-blooded creatures, but also a concomitantly low phytotoxicity.

It will be appreciated that the instant specification and examples are set forth by way of illustration and not limitation, and that various modifications and changes may be made without departing from the spirit and scope of the present invention.

What is claimed is:
1. Phenylsulfonic acid ester of the formula

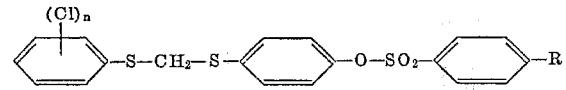

in which R is selected from the group consisting of hydrogen, chloro and fluoro, and $n$ is a whole number from 0 to 1.

2. Compound according to claim 1 wherein R is selected from the group consisting of chloro and fluoro when $n$ is 0, and $n$ is 1 when R is hydrogen.

3. Compound according to claim 1 wherein R' is 4-position chloro and $n$ is 1.

4. Compound according to claim 1 wherein R is hydrogen, and $n$ is 1.

5. Compound according to claim 1 wherein R is chloro, and $n$ is 0–1.

6. Compound according to claim 1 wherein such compound is 4-fluoro-phenylsulfonic acid 4'-(4''-chlorophenylmercaptomethylmercapto)-phenyl ester of the formula

7. Compound according to claim 1 wherein such compound is phenylsulfonic acid 4-(4'-chlorophenylmercaptomethylmercapto)-phenyl ester of the formula

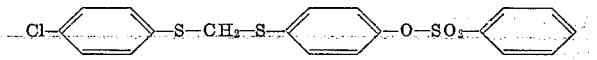

8. Compound according to claim 1 wherein such compound is 4-chloro-phenylsulfonic acid 4'-(4''-chlorophenylmercaptomethylmercapto)-phenyl ester of the formula

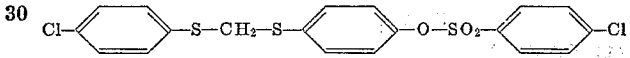

9. Compound according to claim 1 wherein such compound is 4-fluoro-phenylsulfonic acid 4'-phenylmercaptomethylmercapto)-phenyl ester of the formula

References Cited

UNITED STATES PATENTS 3,408,382  10/1968  Sinenberg et al. _____ 260—456 P
2,900,404  8/1959   Weinstein _____ 260—456 P LEON ZITVER, Primary Examiner L. B. DeCRESCENTE, Assistant Examiner U.S. Cl. X.R.

424—303